(12) United States Patent
Wang et al.

(10) Patent No.: US 8,731,323 B2
(45) Date of Patent: May 20, 2014

(54) GENERAL BANDING AND CODEC BANDING ARTIFACT REMOVAL

(75) Inventors: Haiyun Wang, Singapore (SG); Lucas Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 229 days.

(21) Appl. No.: 13/304,118

(22) Filed: Nov. 23, 2011

(65) Prior Publication Data

US 2013/0128122 A1      May 23, 2013

(51) Int. Cl.
*G06K 9/40*      (2006.01)

(52) U.S. Cl.
USPC ........... 382/275; 382/305; 382/232; 382/294; 382/190

(58) Field of Classification Search
USPC .......................... 382/165, 199, 266; 348/607
See application file for complete search history.

(56) References Cited

U.S. PATENT DOCUMENTS

| | | | | |
|---|---|---|---|---|
| 4,573,070 A | * | 2/1986 | Cooper | 348/617 |
| 5,047,930 A | * | 9/1991 | Martens et al. | 600/301 |
| 5,299,118 A | * | 3/1994 | Martens et al. | 600/509 |
| 5,441,051 A | * | 8/1995 | Hileman et al. | 600/454 |
| 6,084,989 A | * | 7/2000 | Eppler | 382/293 |
| 6,633,683 B1 | * | 10/2003 | Dinh et al. | 382/260 |
| 6,741,741 B2 | * | 5/2004 | Farrell | 382/199 |
| 6,925,207 B1 | * | 8/2005 | Sezan et al. | 382/209 |
| 7,412,282 B2 | * | 8/2008 | Houben | 600/515 |
| 8,139,883 B2 | * | 3/2012 | Zhang et al. | 382/254 |
| 2002/0126330 A1 | * | 9/2002 | Farrell | 358/538 |
| 2006/0056724 A1 | * | 3/2006 | Le Dinh et al. | 382/274 |
| 2007/0009157 A1 | * | 1/2007 | Shirasaka | 382/190 |
| 2009/0060375 A1 | | 3/2009 | Lim et al. | |
| 2010/0142808 A1 | | 6/2010 | Bhagavat et al. | |

* cited by examiner

*Primary Examiner* — Vu Le
*Assistant Examiner* — Aklilu Woldemariam
(74) *Attorney, Agent, or Firm* — Hogan Lovells US LLP

(57) ABSTRACT

A method and apparatus are disclosed for identifying and removing banding artifacts (i.e., false contours) resulting from insufficient bit depth caused by digital image quantization, conversion, and/or compression. This method includes: explicitly identifying texture block and flat block; de-termination of filter window sizes with the consideration of handling transitions between texture block and flat block; de-banding filtering with edge protection; and noise shaping according to de-banding filter result.

20 Claims, 5 Drawing Sheets

FLAT
BLOCK
(8X8)

WinSizes:

TEXTURE
BLOCK
(8X8)

WinSizes:

GENERAL BANDING AND CODEC BANDING ARTIFACT REMOVAL

FIELD OF THE INVENTION

The present invention generally relates to picture quality improvement or artifact removal in the field of digital image and video sequence processing. More particularly, the invention relates mainly to an artifact removal method targeting general video source banding artifacts or video codec (e.g., MPEG, FLV, Divx, or H.264) generated banding artifacts. This invention can be implemented in a digital image quality improvement system developed for set-top-box and high-definition TV applications.

BACKGROUND OF THE INVENTION

General banding in a digital image or video sequence can be caused by coarse quantization of gray scale value or color values and typically gives a "false contour" effect in a smooth region of a picture. In addition, such "false contour" may be affected by various codec compression standards to become more "square mosaic," i.e., codec banding.

There are several causes for the occurrence of banding artifacts. One general cause is the manipulation or conversion applied to digital images which are quantized near the limit of just noticeable gray scale value or color differences; another cause is the compression of an image or video sequence by various video codec.

Conversional methods such as noise mask or dithering method may result in artificial patterns occurring in an entire image. In recent years, pixel-wise "false contour" detection and removal approaches have been proposed, e.g., US2010/0142808 or US2009/0060375. In these kinds of methods, the detection of banding is performed by calculating the color value offset for each pixel within a region determined by the scale, followed by applying certain criteria to decide yes/no locally to de-banding.

Referring to the above-mentioned related arts, the existing methods mainly explore pixel-wise image gray scale or color differences. Most of the proposed methods do not take into consideration coded block boundaries offset generated by compression codec (i.e., blockiness artifacts), and they do not identify and protect texture region explicitly (i.e., light texture blurring). Furthermore, there is little work on handling "new false contour" occurring in the transition between banding and non-banding region, or the transition between banding region and mono-tone region, respectively.

SUMMARY OF THE INVENTION

Accordingly, the invention is directed to removing general video source banding artifacts or video codec generated banding artifacts.

An objective of an embodiment of the invention is to provide an apparatus and method for banding artifacts removal that takes into consideration coded block boundaries offset generated by compression codec, i.e. blockiness artifacts. Another objective includes identifying and protecting texture region explicitly, i.e. light texture blurring. Yet another objective includes handling transition between banding and non-banding region, i.e. "new false contour." A further objective includes handling transition between banding region and monotone region, i.e. "new false contour."

According to one embodiment of the invention, an apparatus for removing banding artifacts comprises a block classification processing module, and a de-banding filtering module coupled to the block classification processing module. In another embodiment, the apparatus further comprises a noise shaping processing module coupled to the de-banding filtering module.

According to another embodiment of the invention, a method of block classification comprising calculating a block max edge magnitude and a normalized block min edge magnitude as two axes of a 2D mask, wherein a value of the block max edge magnitude and the normalized block min edge magnitude represents the probability of banding artifacts.

According to yet another embodiment of the invention, a method of noise generation and noise shaping comprises generating temporal, spatial and pure flat noises.

According to a further embodiment of the invention, a method for removing banding artifacts comprises conducting block classification based on coded block location and block max/min edge analysis to explicitly identify texture block and flat block, determining a de-banding window size according to surrounding block classifications and current pixel position within a current block to handle transitions between texture block and flat block, applying a de-banding filter to the current pixel according to determined the de-banding window size, and applying a noise shaping function according to a result of the de-banding filter to fine tune transitions between mono-tone region, de-banding region, and re-quantized output result.

The foregoing and other features, utilities and advantages of the invention will be apparent from the following more particular description of an embodiment of the invention as illustrated in the accompanying drawings.

DETAILED DESCRIPTION

Embodiments of the present invention are hereafter described in detail with reference to the accompanying figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying figures is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention focuses on addressing all the above-mentioned issues, and it has been proven to be more accurate and effective on certain kinds of decoded streams as it is able to explore the stream information (e.g., frame/field flag) extracted by codec.

The approach of the present invention is to perform the feature analysis at block level and conduct the processing (e.g., de-banding filtering, and noise shaping) at pixel level.

First, block classification is conducted based on coded block location and block max/min edge analysis to explicitly identify texture block and flat block.

Second, a de-banding window size is determined according to surrounding block classifications and current pixel position within current block to handle transitions between texture block and flat block.

Third, a de-banding filter is applied to current pixel according to determined de-banding window size. The de-banding filter can be further steered by a definable sigma to improve filtering on banding region and protect texture edge features.

Finally, a noise shaping function can be applied according to de-banding filter result to fine tune transitions between mono-tone region, de-banding region, and re-quantized output result.

Figure 1:
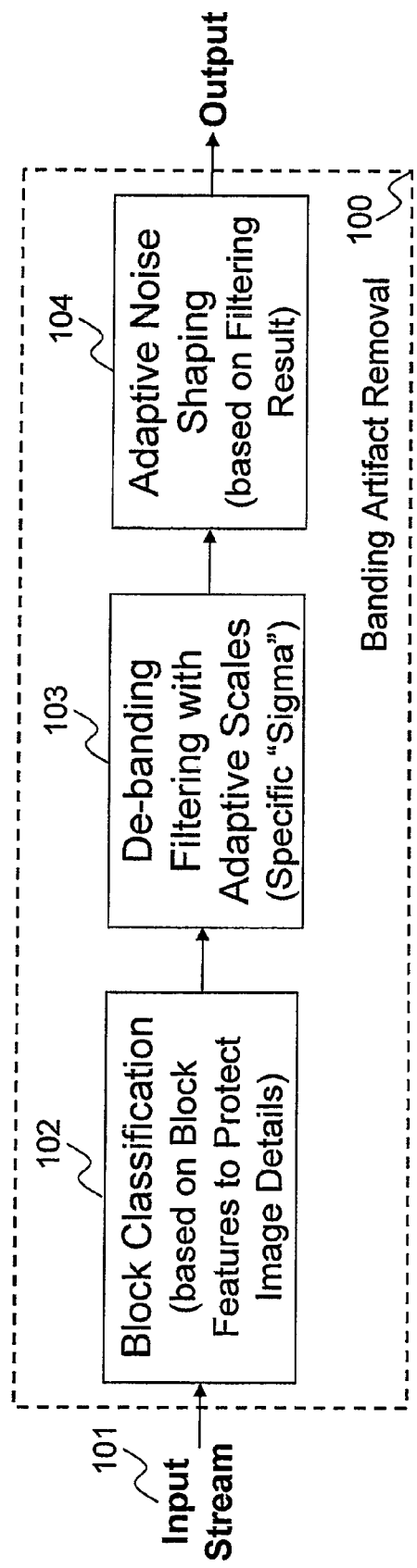
FIG. 1 illustrates an overview block diagram of the functions/processes of the banding artifact removal according to an embodiment of the invention.

With reference now to the figures, FIG. 1 shows an embodiment of system 100 that may be used to reduce or remove banding artifacts from a frame decoded from an input stream 101. System 100 contains three main processing parts. A first processing may be a block classification 102, which performs the block-based image feature extraction and block type identification to protect image details. The second processing follows up the block classification 102 may be de-banding filtering 103, which is applied to each pixel according to the pre-determined scales and further steered by a definable sigma. The third processing follows up the de-banding filtering 103 with noise shaping 104, which can be conducted according to the filtering results and taking consideration of the transitions between different types of regions in the frame.

Figure 2:
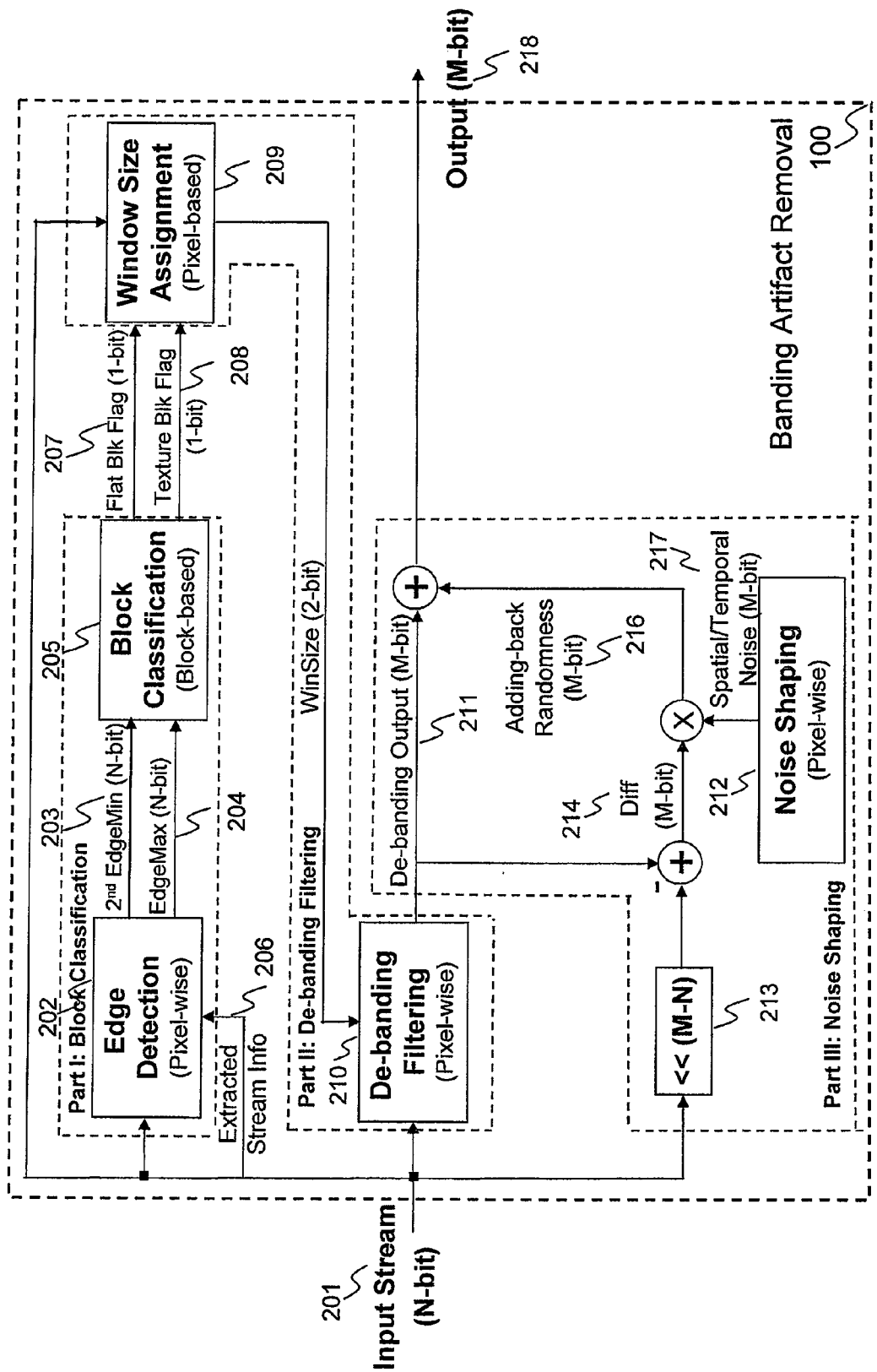
FIG. 2 illustrates a functional block diagram with the details of data input/output according to an embodiment of the invention.

FIG. 2 shows an example of embodiments of the current invention with more details on functions and processes.

An input stream 201 with N-bit gray scale depth on both luminance Y and chrominance U/V components is processed by three main processing, i.e., parts I-III, from the first block in the top-left of the figure to the bottom-right of the final output. Here, the part I "block classification" indicates the analysis performed within each block (e.g., DCT block) and the part II "de-banding filtering" and the part III "noise shaping" indicate the processing performed on each pixel.

The input stream 201 is firstly fetched into edge detection 202 for extracting the block-wise features like the minimum edge magnitude 203 and the maximum edge magnitude 204 of the current block. Here, the minimum edge magnitude 203 can be further exploited by excluding the zero values and applying normalization process in order to make it more accurate for the subsequent block classification 205, which aims at differentiating the flat block and the texture block. As the block classification is coded block location based, stream information 206 indicating block level frame/field coding can be extracted by the decoder which can be further incorporated into edge detection and classification. Furthermore, as an example, a 2D masking method illustrated in FIG. 3 can be use to classify the blocks into different types. The outputs of block classification 205 can be two kinds of flags, i.e., flat block flag 207 which indicates the current block containing banding artifact with high possibility, or texture block flag 208 which indicates the current block containing image details with high possibility. The flag is consistent within the current block.

After performing the block classification processing (i.e., Part I), the detected flat block flag 207 or the texture block flag 208 can be fetched into window size assignment 209 to determine a filtering window size for each pixel. Example filtering window sizes can be found in Table 1. The output window size 209 is further fetched into de-banding filtering 210 and is used for applying the filter to remove the banding artifacts. Here, the design of the de-banding filter with a definable sigma (FiltThresh) can be referred to the equations listed in Equation 1.

DBD WinSizes on Luma/Chroma:

TABLE 1

| WinW × WinH | WinSize 4 | WinSize 3 | WinSize 2 | WinSize 1 | WinSize 0 |
|---|---|---|---|---|---|
| On Luma | N × N | (N-4) × (N-4) | (N-10) × (N-10) | (N-12) × (N-12) | no filtering |
| On Chroma | (N-4) × (N-4) | (N-8) × (N-8) | (N-10) × (N-10) | (N-12) × (N-12) | no filtering |

[Note]:
N is an integer number which should be larger than 12 and can be up to 21 according to our experiments.

After performing the de-banding filtering processing (i.e., Part II), the de-banding output 211, which can be resulted into different bit depths (e.g., M-bit) from the original N-bit input data, and it can be further exploited as one of the inputs of the subsequent noise shaping processing (i.e., Part III). Another input of noise shaping 212 is the original input frame stream 201 with, for instance, N-bit Y/U/V components, which can be left-shifted 213 to certain bits according to the bit difference between the de-banding output 211 and the original input frame stream 201. Then the gray value difference (i.e., Diff) 214 between the two inputs of noise shaping 212 can be calculated and further multiplied with the spatial/temporal noise 217 generated by the noise shaping 212 as the adding-back randomness 216 to the de-banding output 211. Here, the strength of the adding-back randomness 216 can be dually controlled by the Diff 214 and the magnitude of spatial/temporal noise 217. Please refer to FIG. 5 for further details of spatial/temporal noise generation. After performing all the above-mentioned processes, the final output 218 of the system 100 can be generated without banding artifacts.

Figure 3:
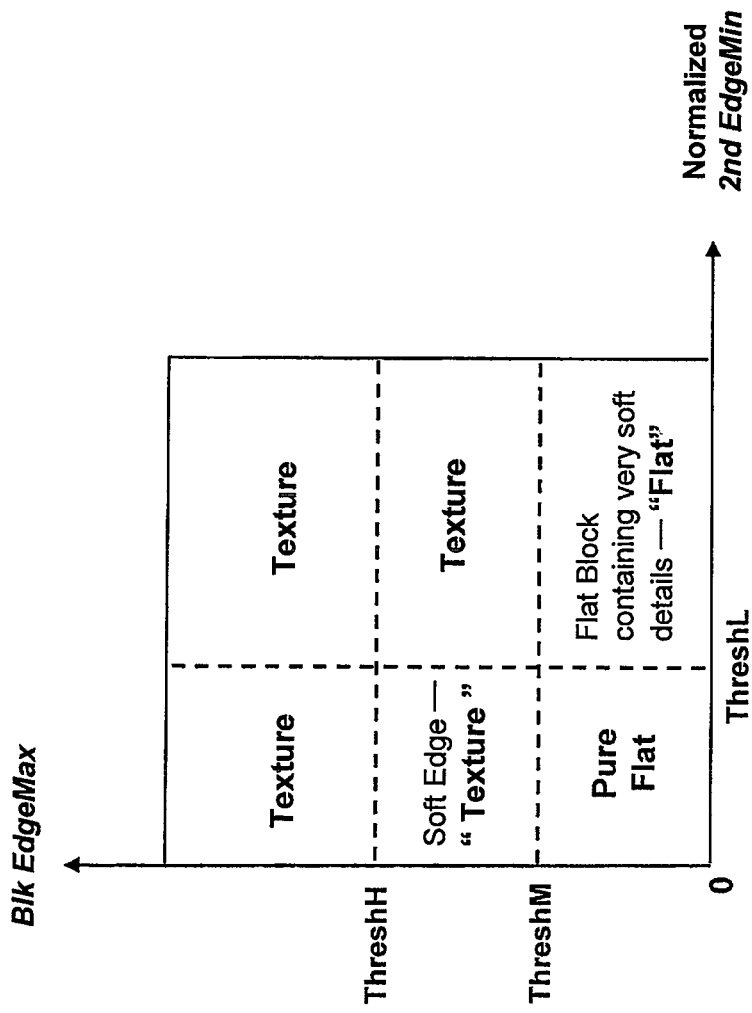
FIG. 3 shows an exemplary of block classification method using 2D masking concept according to an embodiment of the invention.

FIG. 3 shows an example of a block classification method according to an embodiment of the invention.

As mentioned above, the purpose of block classification is to identify the flat block which possibly contains banding artifacts and the texture block which contains image details, respectively. There are several kinds of methods that can be explored to perform the classification. In this invention, for instance, the 2D masking approach can be applied by designing a 2D mask aligned with human visual system. Certain block statistics or features like min/max edge, local variance, etc., can be exploited to classify the blocks into different types. As an example, the block max edge magnitude (i.e., Blk EdgeMax) and the normalized block min edge magnitude (i.e., Normalized 2nd EdgeMin) are calculated and designed as the two axes of the 2D mask. Where the lower the value of block "min/max edge" is, the lesser the possibility of the image details being present, and the higher the possibility of banding artifacts occurring; thus, the so-called flat block and texture block can be determined by applying certain thresholdings (e.g., ThreshL/M/H) as illustrated in FIG. 3.

In an alternative embodiment, other kinds of block/region features can be extracted and N–D (N=1, 2 . . . ) mask can be designed to achieve the similar target of block classification.

Figure 4:
FIG. 4 shows exemplary window size assignments on flat block and texture block, respectively, according to an embodiment of the invention.
Figure 4:
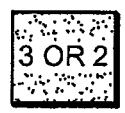
Figure 4:
Figure 4:
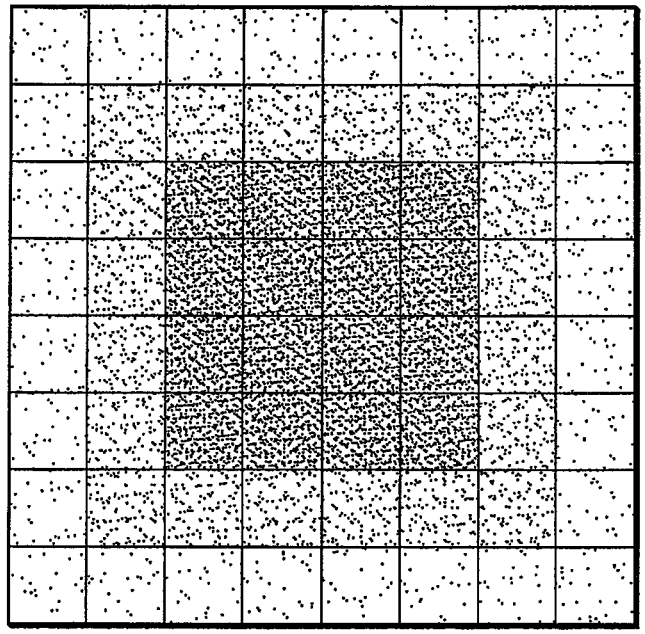
Figure 4:
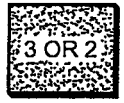
Figure 4:
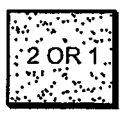
Figure 4:
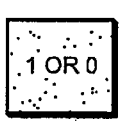
Figure 4:
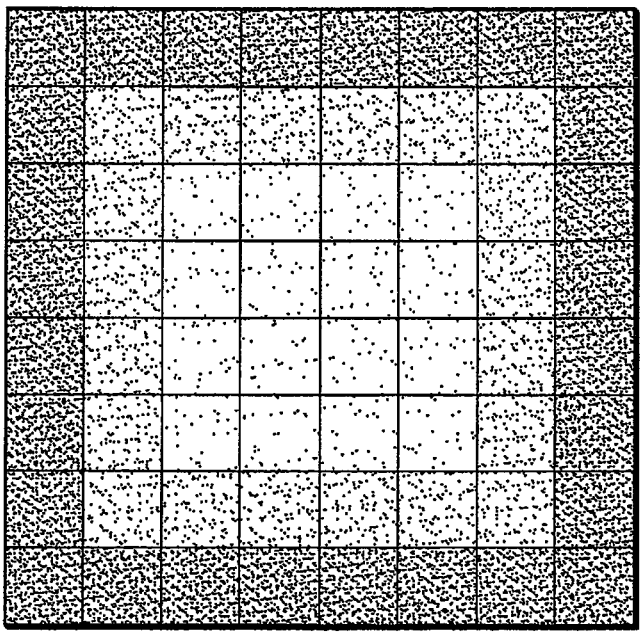

The method of assigning different window sizes, which are listed in Table 1, serves the purpose of preventing "new block boundary" or "new false contour" at boundary of Flat block and Texture block. In general, maximum window size is applied to Flat blocks, and minimum window size (or no filtering) is applied to Texture block. At boundary between Flat block and Texture block, adaptive window size may be applied according to FIG. 4; hence, smaller window size closer to the boundary for Flag block and bigger window size closer to the boundary for Texture block.

Equation 1 shows an example of the de-banding filter design. Here, the value of FiltThresh (or definable sigma) in the equation is controllable to steer the filter strength. Let $I_0$ be the gray value of the current pixel under processing which is located in the center of filter window, the current WinSize is WinW×WinH, and FiltThresh is the manually selected threshold for de-banding filtering. Let I(x,y) be the gray value of each pixel located within the filter window, I'(x,y) is the intermediate filtered output, and I"(x,y) is the final filtering output which can be calculated as:

$$\begin{cases} I'(x, y) = I_0 + FiltThresh, & \text{if } I(x, y) > (I_0 + FiltThresh); \\ I'(x, y) = I_0 - FiltThresh, & \text{if } I(x, y) < (I_0 - FiltThresh); \\ I'(x, y) = I(x, y), & \text{else.} \end{cases} \quad \text{Equation 1}$$

$$I''(x, y) = \frac{\sum_{x=0}^{(WinH-1)} \sum_{y=0}^{(WinW-1)} I'(x, y)}{WinH \times WinW}$$

Figure 5:
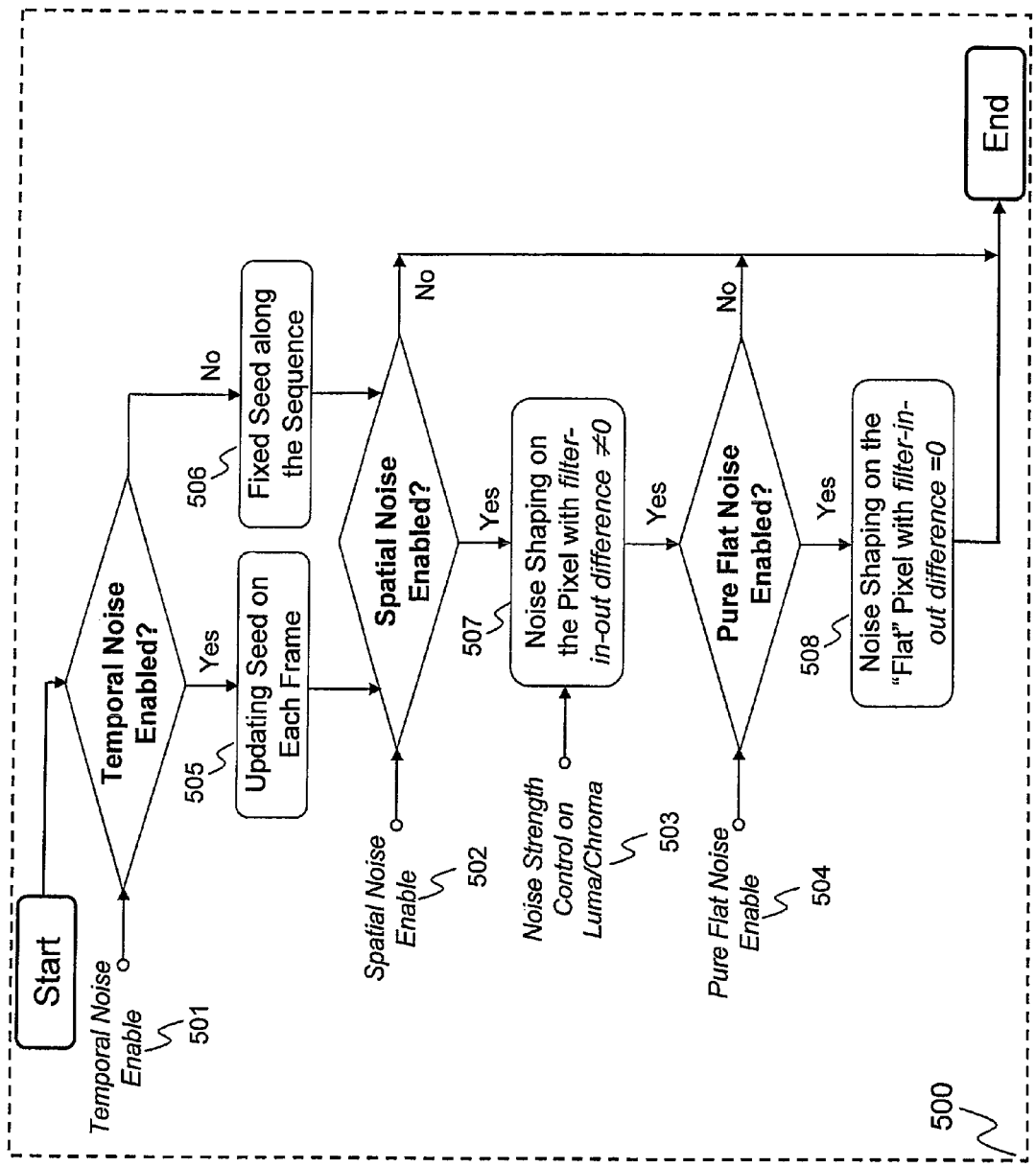
FIG. 5 illustrates a functional block diagram of noise generation and noise shaping according to an embodiment of the invention.

FIG. 5 shows the diagram of noise generation and noise shaping methods.

The noise generation and noise shaping consist of how to generate spatial/temporal noise and how to apply the noise to certain regions in a frame. There are four control parameters introduced into the system 500. i.e., temporal noise enable 501, spatial noise enable 502, noise strength control on Luma/Chroma 503, and pure flat noise enable 504. If the temporal noise is enabled, the seed of noise generator should be updated temporally on each frame 505; if it is not enabled, fixed seed is applied over the whole sequence 506. If the spatial noise is enabled 502, the noise can be adaptively added on each pixel given that the de-banding filter-in-out difference is not equal to zero 507. That means the spatial noise is added on all the pixels being effectively filtered by the de-banding filter. In an alternative embodiment, independent noise strength control on luma and chroma 503 can be applied to the noise shaping 507. If the spatial noise is not enabled, the noise shaping is terminated. Finally, if the pure flat noise 504 is enabled, the detection of "pure flat" (i.e., monotone) pixel can be performed by checking whether the de-banding filter-in-out difference equals to zero or not 508; if enabled, the spatial noise can be added on "pure flat" pixel and vice versa.

In an embodiment, the present invention can be implemented in software as executed by a central processing unit. Software programming code, which can embody the present invention is typically accessed by a microprocessor from long-term, persistent storage media of some type, such as a flash drive or hard drive. The software programming code may be embodied in any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

While the invention has been particularly shown and described with reference to a preferred embodiment thereof, it will be understood by those skilled in the art that various other changes in the form and details may be made without departing from the spirit and scope of the invention.

A presently preferred embodiment of the present invention and many of its improvements have been described with a degree of particularity. It should be understood that this description has been made by way of example, and that the invention is defined by the scope of the following claims.

We claim:

1. An apparatus for removing banding artifacts, comprising:

a block classification processing module; and
a de-banding filtering module coupled to the block classification processing module,
wherein the block classification processing module comprises:
an edge detection unit; and
a block classification unit coupled to the edge detection unit,
wherein the block classification unit is configured to differentiate flat blocks and texture blocks,
wherein the de-banding filtering unit is configured to removing banding artifacts according to the equation $$\begin{cases} I'(x, y) = I_0 + FiltThresh, & \text{if } I(x, y) > (I_0 + FiltThresh); \\ I'(x, y) = I_0 - FiltThresh, & \text{if } I(x, y) < (I_0 - FiltThresh); \\ I'(x, y) = I(x, y), & \text{else.} \end{cases}$$

$$I''(x, y) = \frac{\sum_{x=0}^{(WinH-1)} \sum_{y=0}^{(WinW-1)} I'(x, y)}{WinH \times WinW}, \text{ and}$$

wherein FiltThresh comprises a definable sigma in the equation that is controllable to steer the filter strength, $I_0$ comprises a gray value of the current pixel under processing which is located in the center of filter window, a current window size WinSize is WinW×WinH, FiltThresh further comprises the manually selected threshold for de-banding filtering, I(x,y) comprises a pray value of each pixel located within the filter window, I'(x,y) comprises an intermediate filtered output, and I"(x,y) comprises a final filtering output.

2. The apparatus of claim 1, further comprising a noise shaping processing module coupled to the de-banding filtering module.

3. The apparatus of claim 1, wherein the block classification processing module is configured to perform coded block location based image feature extraction and block type identification.

4. The apparatus of claim 1, wherein the de-banding filtering module is configured to be applied to each pixel according to a filtering window.

5. The apparatus of claim 4, wherein the de-banding filtering module is further configured to be steered by a definable sigma.

6. The apparatus of claim 2, wherein the noise shaping processing module is configured to be conducted according to filtering results of the de-banding filtering module.

7. The apparatus of claim 1, wherein the edge detection unit is configured to extract block-wise features of a coded block.

8. The apparatus of claim 1, wherein the de-banding filtering module comprises:
a window size assignment unit; and
a de-banding filtering unit coupled to the window size assignment unit.

9. The apparatus of claim 1, wherein the window size assignment unit is configured to determine a filtering window for a pixel.

10. The apparatus of claim 8, wherein the filtering window is adaptively determined according to distance to boundary of flat block and texture block.

11. The apparatus of claim 2, wherein the noise shaping processing module is configured to calculate a gray value difference between a de-banding output data and an original input frame, multiply the gray value difference with a spatial/temporal noise generated by a noise shaping unit as an adding-back-randomness, and adding the adding-back randomness to the de-banding output.

12. The apparatus of claim 11, wherein the noise shaping unit is configured to generate temporal, spatial and pure flat noise.

13. A method for block classification comprising calculating a block max edge magnitude and a normalized block min edge magnitude as two axes of a 2D mask, wherein a value of the block max edge magnitude and the normalized block min edge magnitude represents the probability of banding artifacts.

14. The method of claim 13, further comprising applying thresholdings to determine flat blocks and texture blocks.

15. A method for noise generation and noise shaping, comprising, if temporal noise is enabled, updating a seed of a noise generator temporally on each frame, otherwise, applying a fixed seed over a whole sequence.

16. The method of claim 15, further comprising if spatial noise is enabled, adaptively adding a spatial noise on each pixel if a de-banding filter-in-out difference is not equal to zero.

17. The method of claim 16, wherein noise strength control on luma/chroma is applied to the adaptively adding of the spatial noise.

18. The method of claim 16, further comprising if pure flat noise is enabled, the spatial noise can be added on pure flat pixels.

19. The method of claim 18, wherein pure flat pixels are detected by checking whether the de-banding filter-in-out difference equals to zero.

20. A method for removing banding artifacts, comprising:
one or more processors implementing on the following steps;
conducing block classification based on coded block location and block max/min edge analysis to explicitly identify texture block and flat block;
determining a de-banding window size according to surrounding block classifications and current pixel position within a current block to handle transitions between texture block and flat block;
applying a de-banding filter to the current pixel according to the determined de-banding window size; and
applying a noise shaping function according to a result of the de-banding filter to fine tune transitions between mono-tone region, de-banding region, and re-quantized output result,
wherein the de-banding filtering unit is configured to removing banding artifacts according to the equation $$\begin{cases} I'(x, y) = I_0 + FiltThresh, & \text{if } I(x, y) > (I_0 + FiltThresh); \\ I'(x, y) = I_0 - FiltThresh, & \text{if } I(x, y) < (I_0 - FiltThresh); \\ I'(x, y) = I(x, y), & \text{else.} \end{cases}$$

$$I''(x, y) = \frac{\sum_{x=0}^{(WinH-1)} \sum_{y=0}^{(WinW-1)} I'(x, y)}{WinH \times WinW}, \text{ and}$$

wherein FiltThresh comprises a definable sigma in the equation that is controllable to steer the filter strength, $I_0$ comprises a gray value of the current pixel under processing which is located in the center of filter window, a current window size WinSize is WinW×WinH, FiltThresh further comprises the manually selected threshold for de-bandinq filtering, I(x,y) comprises a gray value of each pixel located within the filter window, I'(x,y) comprises an intermediate filtered output, and I"(x,y) comprises a final filtering output.

* * * * *

UNITED STATES PATENT AND TRADEMARK OFFICE
CERTIFICATE OF CORRECTION

PATENT NO. : 8,731,323 B2  
APPLICATION NO. : 13/304118  
DATED : May 20, 2014  
INVENTOR(S) : Haiyun Wang and Lucas Hui Page 1 of 1

It is certified that error appears in the above-identified patent and that said Letters Patent is hereby corrected as shown below:

In the Claims

Column 6, claim 1, line 66, "pray" should be --gray--

Column 8, claim 20, line 50, "de-bandinq" should be --de-banding--

Signed and Sealed this  
Fifth Day of August, 2014

Michelle K. Lee  
*Deputy Director of the United States Patent and Trademark Office*